United States Patent Office 3,504,850
Patented Apr. 7, 1970

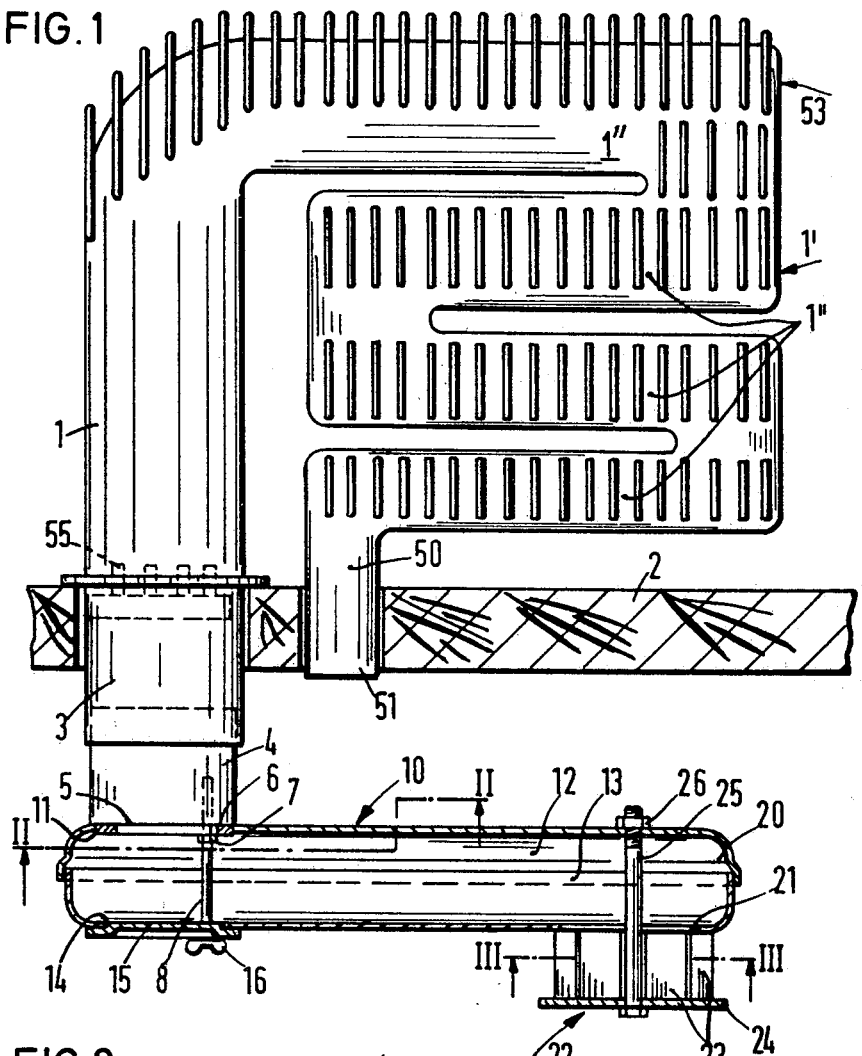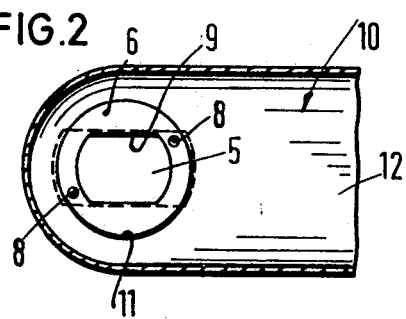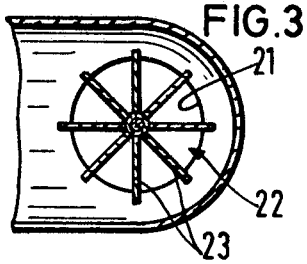

3,504,850
SPACE HEATER
Willi Mossbach, Kirchseeon, Germany, assignor to
Philipp Kreis, Munich, Germany
Filed May 16, 1968, Ser. No. 729,606
Claims priority, application Germany, May 16, 1967,
K 62,297
Int. Cl. F24b 7/06
U.S. Cl. 237—52                                              5 Claims

ABSTRACT OF THE DISCLOSURE

A space heater which is completely closed against the room to be heated receives the combustion air from below the floor through a channel laterally attached for pivotal movement to the inlet duct passing through the floor to the combustion chamber of the heater.

---

The invention relates to a space heater.

More particularly, the invention relates to a space heater operated with gaseous or gasified fuel for small rooms, particularly trailers, trailer cabs, log cabins, weekend cottages, and the like, where the heater comprises a combustion chamber sealed against the space to be heated and where the fresh air for the combustion enters unthrottled from the outside through the floor of the room and where the combustion gases, after heat exchange with the air in said room, escape through an outlet opening to the outside.

Such a space heater comprises on the floor of the room to be heated a vertical updraft and an adjoining vertical downdraft shaft for the combustion gases; the downdraft shaft consists of several horizontal sections connected by elbow joints and terminates near the floor into an outlet flange. To said outlet flange, there is connected an exhaust gas channel which passes through the floor downwardly or through a side wall or over the roof. The sharp downward reversal of direction of the exhaust gases requires favorable flow conditions. For the heater proper, such conditions can be determined by calculations and tests.

However, it is impossible to consider always sufficiently the wind and local conditions when the combustion air has to be taken from below the floor of the space to be heated. This problem arises particularly for trailers which frequently change their location and are placed on different foundations.

It is, therefore, a principal object of the invention to provide a space heater of the character described herein, with an improved air feed which is substantially independent of the local conditions.

Other objects and advantages will become apparent from a consideration of the specification and claims.

According to the invention, the air inlet duct which feeds the air from below the floor of the room to be heated into the combustion zone of the heater is connected to a lateral cross channel which encloses the opening of said duct, is mounted for pivotal movement around the middle axis of the inlet duct, and has at its outer end a downwardly directed inlet opening.

In said inlet opening, a stellate or cruciform lattice comprising a plurality of intercrossing radial walls provides for equal inlet conditions all around so that the efficiency of said intake lattice is the same in every pivotal position of the channel.

The air feed channel of the invention is of simple construction and manufacture. The intake opening for the air can be adjusted along a swing path so as to take advantage of the most favorable conditions.

Of particular advantage is the combination of a swingable air inlet channel with an exhaust channel for the combustion gases also arranged below the floor of the room to be heated.

The invention will be more readily understood from the description of a preferred embodiment shown in the accompanying drawings, wherein:

FIG. 1 is a side view of the air inlet duct of a space heater with an air feed channel according to the invention, shown in section, below the floor of the space to be heated;

FIG. 2 is a partial sectional view along line II—II of FIG. 1, and

FIG. 3 is a sectional view of an intake lattice, taken along line III—III of FIG. 1.

Referring first to FIG. 1, the space heater comprises an updraft shaft 1 of approximately rectangular cross section, and an adjoining downdraft 1' extending close to the floor with several superposed turns 1" ending into an outlet duct 50 connecting to an exhaust channel 51 opening through the bottom outwardly into the atmosphere; said channel may be also connected to a chimney arranged laterally on the floor which chimney leads outwardly through the roof or a side wall (not shown) to the outside. The updraft shaft 1 and downdraft shaft 11 form a single-duct channel of approximately equal cross-sectional form whereby the cross section of the passage inside the downdraft shaft decreases from the uppermost horizontal section 53 to the outlet duct 50 in accordance with the volume reduction of the combustion gases due to cooling. An inlet duct 3 extends downwardly through the floor 2 from the updraft shaft 1, in which a burner set 55 is provided at about said level. Said inlet duct 3 is prolonged farther downwardly by an extension member 4, if such extension is advisable because of the supporting structures. Onto the connecting opening 5 of said extension member, there is screwed a centering disc 6 (FIG. 2) by means of nuts 7 and screw bolts 8 which are threaded into threaded openings (not shown) in the thick walls of extension number 4. Said centering disc 6 has a cutout 9 registering with the connecting opening 5, for the passage of air. On said centering disc 6, there is mounted a cross channel 10 with its centering cutout 11. In the example shown, said cross channel is formed by two half-shells 12, 13 fitted into each other. The lower shell 13 is provided with a cutout 14 which is concentric to and about as large as the cutout 11; in said cutout 14, a support disc 15 is mounted and unrotatably connected with the centering disc 6 by means of bolts 8 and wing nuts 16. When said wing nuts 16 are tightened, the cross-channel 10 is locked in its position due to the strong friction contact between the supporting disc 15 and the rim of the cutout 14; when the wing nuts 16 are loosened, the cross channel 10 can be easily turned into any pivotal position around the center axis through the centering and supporting disc 6, 15, or the inlet flange 3. At the lower side of its free end 20, said cross channel has an inlet opening 21 which is covered by an intake stellar lattice 22 (FIG. 3). Said lattice comprises a plurality of baffles 23 which cross each other in the center and project somewhat radially beyond the intake opening 21. The lower side of said lattice is covered by a bottom plate 24. A supporting bolt 25 secures the lattice with the bottom plate 24 to the cross channel 10. It is of advantage to arrange the intake lattice removable for cleaning; for this purpose, it is sufficient to make the bolt at one end, e.g. at 26, detachable. The intake lattice may be made of plastics while the cross channel, for reasons of strength, is best made of sheet metal.

I claim:

1. A space heater which is placed on the floor of a vehicle room to be heated and completely closed against said room, said heater comprising an updraft shaft enclosing the combustion chamber, a downdraft shaft composed of superposed horizontal sections connected for sinuously directing the combustion gases toward said floor and terminating in a downward direction, an outlet flange passing the combustion gases from said downdraft shaft below said floor, an inlet flange passing upwardly through said floor and connected to said updraft shaft, said inlet flange being provided with a connecting opening below said floor, a horizontally laterally extending closed channel connected at one end to said flange below said floor and provided with an upwardly directed outlet opening registering with said connecting opening in the downdraft shaft, said channel having at its other end remote from said outlet opening a downwardly directed air inlet opening, and a swivel support means allowing pivotal movement of said channel around the center axis of said inlet flange to permit locating the air inlet in various locations.

2. A heater as claimed in claim 1 comprising a member extending said inlet flange downwardly, said extension member being provided with said connecting opening.

3. A heater as claimed in claim 1 wherein said swivel support comprises a centering disc secured to said connecting opening of said inlet flange, a supporting disc in said channel arranged in a cutout of said channel oppositely and coaxially disposed to said centering disc, and screw means for adjusting said support disc in a force fit with respect to said channel.

4. A heater as claimed in claim 1 comprising in said air inlet opening a stellate lattice comprising a plurality of baffles extending from the center of the opening radially outwardly and perpendicular to the walls of the opening.

5. A heater as claimed in claim 1 wherein said channel has the form of a flattened rectangular hollow box and is composed of two half shells divided along a longitudinal plane fitted one into the other.

References Cited

UNITED STATES PATENTS

| 1,175,120 | 3/1916 | Brelle. | |
| 1,288,516 | 12/1918 | Cole | 126—91 |
| 1,546,592 | 7/1925 | Lawrence | 126—90 |
| 2,337,105 | 12/1943 | Ische | 237—48 |
| 3,399,661 | 9/1968 | Kreis | 126—118 |

EDWARD J. MICHAEL, Primary Examiner

U.S. Cl. X.R.

126—118